(12) United States Patent
Ninacs et al.

(10) Patent No.: US 12,720,526 B2
(45) Date of Patent: Aug. 25, 2026

(54) USER EQUIPMENT CONFIGURATION FOR SIB AND MIB DECODING

(71) Applicant: Apple Inc., Cupertino, CA (US)

(72) Inventors: Tudor Ninacs, Munich (DE); Onurcan Iscan, Munich (DE); Amir Farajidana, Sunnyvale, CA (US); Amir Aminzadeh Gohari, Sunnyvale, CA (US); Dan Zhang, San Diego, CA (US); Herbert R. Dawid, Herzogenrath (DE); Keith W. Saints, San Diego, CA (US); Ruoheng Liu, San Diego, CA (US); Sami M. Almalfouh, San Jose, CA (US); Sung Eun Lee, Sunnyvale, CA (US); Wenshu Zhang, Sunnyvale, CA (US); Yihong Qi, Santa Clara, CA (US); Yuanye Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 18/303,857

(22) Filed: Apr. 20, 2023

(65) Prior Publication Data

US 2023/0345461 A1 Oct. 26, 2023

Related U.S. Application Data

(60) Provisional application No. 63/363,447, filed on Apr. 22, 2022.

(51) Int. Cl.
*H04W 72/1263* (2023.01)
*H04W 72/232* (2023.01)

(52) U.S. Cl.
CPC ..... *H04W 72/1263* (2013.01); *H04W 72/232* (2023.01)

(58) Field of Classification Search
CPC ... H04W 72/23; H04W 4/70; H04W 72/0446; H04W 74/006; H04W 74/04;
(Continued)

(56) References Cited

U.S. PATENT DOCUMENTS

2014/0334372 A1 11/2014 Vos
2016/0088595 A1* 3/2016 You ........................ H04W 74/04 370/329

(Continued)

FOREIGN PATENT DOCUMENTS

| | | |
|---|---|---|
| EP | 3 079 409 | 10/2016 |
| WO | 2010/144731 | 12/2010 |
| WO | 2011/025772 | 3/2011 |

OTHER PUBLICATIONS

3rd Generation Partnership Project, "Universal Mobile Telecommunications System (UMTS); UE Radio Transmission and Reception (FDD)"; (3GPP TS 25.101 version 4.2.0 Release 4), Apr. 13, 2022, 71 sheets.

*Primary Examiner* — Dady Chery
(74) *Attorney, Agent, or Firm* — Fay Kaplun & Marcin, LLP

(57) ABSTRACT

A user equipment (UE) is configured to receive, from a cell of a network, a system information block (SIB), determine values for scheduling information for the SIB without decoding a Physical Downlink Control Channel (PDCCH) corresponding to the SIB and decode the SIB using the scheduling information. A UE is also configured to receive, from a cell of a network, a message to be decoded, receive, from a source different from the cell, additional information related to a portion of the message, determine the portion of the message using the additional information and decode the message based at least in part on the determined portion of the message.

15 Claims, 4 Drawing Sheets

(58) Field of Classification Search
CPC ........... H04W 72/1263; H04W 72/232; H04W 48/12; H04L 5/0053; H04L 5/0094; H04L 5/0033; H04L 5/001; H04L 5/0023; H04L 5/0069; H04L 5/0082; H04L 5/0091
See application file for complete search history.

(56) References Cited

U.S. PATENT DOCUMENTS

| | | | | |
|---|---|---|---|---|
| 2018/0167911 | A1* | 6/2018 | Kota | H04W 72/02 |
| 2021/0022026 | A1* | 1/2021 | Onggosanusi | H04B 17/327 |
| 2021/0119727 | A1* | 4/2021 | Chen | H04L 1/0045 |

* cited by examiner

Network Arrangement 100
UE 110
gNB 120A
5G NR RAN 120
Cellular Core Network 130
Internet 140
IMS 150
Network Services Backbone 160

USER EQUIPMENT CONFIGURATION FOR SIB AND MIB DECODING

PRIORITY/INCORPORATION BY REFERENCE

This application claims priority to U.S. Provisional Application Ser. No. 63/363,447 filed on Apr. 22, 2022, and entitled "User Equipment Configuration for SIB and MIB Decoding," the entirety of which is incorporated by reference herein.

BACKGROUND

In a new radio (NR) network, a user equipment (UE) will decode a master information block (MIB) to obtain information that may be used to attach to a cell of the NR network. The entire MIB payload needs to be decoded to obtain certain information required to attach to the cell. However, the conventional MIB decoding may affect the efficiency of the UE at lower signal-to-noise ratio (SNR) conditions. After decoding the MIB, the UE may also decode one or more system information blocks (SIBs) to obtain additional information. Decoding the SIB requires decoding a physical downlink control channel (PDCCH) which contains the scheduling information for the SIB. However, decoding the PDCCH may congest the overall decoding performance of the SIB. Therefore, it would be beneficial to decode the SIB without decoding the PDCCH to improve the overall SIB decoding especially for low SNR scenarios.

SUMMARY

Some exemplary embodiments are related to a processor of a user equipment (UE) configured to perform operations. The operations include receiving, from a cell of a network, a system information block (SIB), determining values for scheduling information for the SIB without decoding a Physical Downlink Control Channel (PDCCH) corresponding to the SIB and decoding the SIB using the scheduling information.

Other exemplary embodiments are related to a user equipment (UE) having a transceiver configured to communicate with a cell of a network and a processor communicatively coupled to the transceiver configured to perform operations. The operations include receiving, from the cell of the network, a system information block (SIB), determining values for scheduling information for the SIB without decoding a Physical Downlink Control Channel (PDCCH) corresponding to the SIB and decoding the SIB using the scheduling information.

Still further exemplary embodiments are related to a processor of a user equipment (UE) configured to perform operations. The operations include receiving, from a cell of a network, a message to be decoded, receiving, from a source different from the cell, additional information related to a portion of the message, determining the portion of the message using the additional information and decoding the message based at least in part on the determined portion of the message.

Additional exemplary embodiments are related to a user equipment (UE) having a transceiver configured to communicate with a cell of a network and a processor communicatively coupled to the transceiver and configured to perform operations. The operations include receiving, from the cell of the network, a message to be decoded, receiving, from a source different from the cell, additional information related to a portion of the message, determining the portion of the message using the additional information and decoding the message based at least in part on the determined portion of the message.

DETAILED DESCRIPTION

Figure 1:
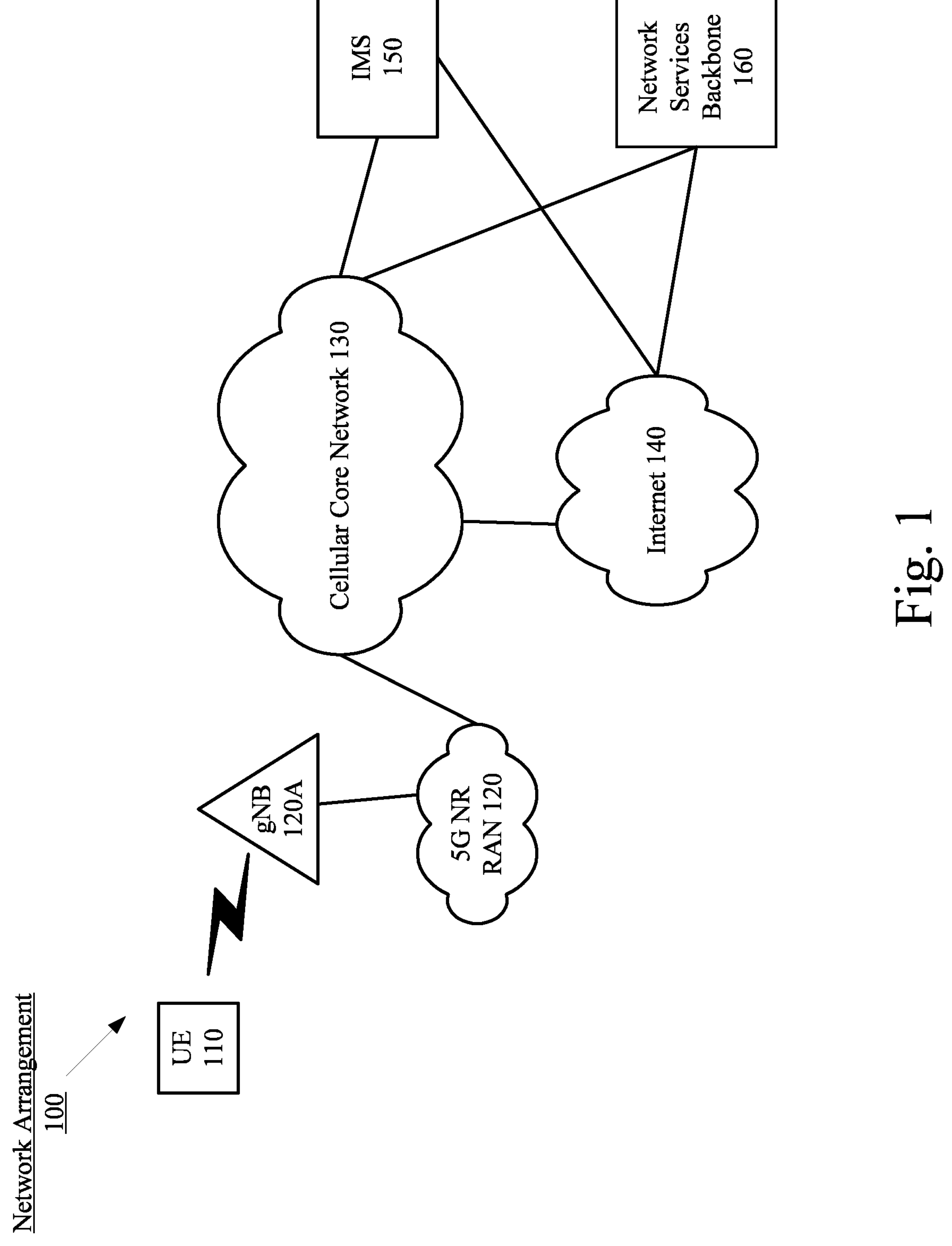
FIG. 1 shows an exemplary network arrangement according to various exemplary embodiments.

The exemplary embodiments may be further understood with reference to the following description and the related appended drawings, wherein like elements are provided with the same reference numerals. In one aspect, the exemplary embodiments introduce exemplary techniques for a user equipment (UE) to decode system information blocks (SIB) without decoding a corresponding physical download control channel (PDCCH). In the exemplary embodiments, the SIB may be decoded using scheduling information contained in downlink control information (DCI) carried on the PDCCH. As will be described in more detail below, the exemplary techniques described herein may enable a UE to decode a SIB efficiently especially during low signal-to-noise ratio (SNR) without decoding the corresponding PDCCH. In another aspect, the exemplary embodiments further introduce techniques to configure a UE to improve master information block (MIB) decoding. As will be described in more detail below, the exemplary techniques described herein may enable a UE to efficiently decode MIB messages, and thus may improve network performance.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device that directly communicates with the network.

In one aspect, the exemplary embodiments are described with regard to SIB decoding. Those skilled in the art will understand that a SIB generally carries information that is relevant in evaluating when the UE may be allowed to access a cell and/or define the scheduling of other system information. Under conventional circumstances, for the UE to decode the SIB transmitted from the base station, the UE is required to first decode the corresponding PDCCH to obtain scheduling information for the SIB. However, decoding the PDCCH to obtain scheduling information for SIB decoding may impede traffic flow and the overall decoding performance for the SIB. Thus, the exemplary embodiments introduce techniques that allow the UE to decode the SIB without decoding the PDCCH.

As will be described in more detail below, techniques are introduced to decode the SIB without decoding the PDCCH to obtain scheduling information (e.g., DCI) to decode SIB. The exemplary SIB decoding techniques described herein may be used in conjunction with currently implemented SIB decoding techniques, future implementations of SIB decoding techniques or independently from other SIB decoding techniques.

In another aspect, the exemplary embodiments are further described with regard to MIB decoding in 5G NR. Those skilled in the art will understand that a MIB generally contains information about cell bandwidth and the system frame number (SFN). Under conventional circumstances, a UE is required to decode all the information contained in the MIB to obtain the information required to attach to a certain cell. However, this mode of decoding MIB to obtain the required information may affect the efficiency of the UE at lower SNR conditions, e.g., the UE may experience decoding errors that does not allow the UE to properly decode all the MIB information. Thus, the exemplary embodiments introduce techniques that allows the UE to decode the MIB by determining the SFN via other information sources and utilizing processing techniques in conjunction with the known SFN to decode the complete MIB.

As will be further described in more detail below, the techniques are introduced to enhance MIB decoding. The exemplary MIB decoding techniques described herein may be used in conjunction with currently implemented MIB message decoding techniques, future MIB message decoding techniques or independently from other MIB message decoding techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., gNB 120A). However, as mentioned above, reference to the 5G NR-RAN 120 is merely for illustrative purposes and any appropriate type of RAN may be used.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
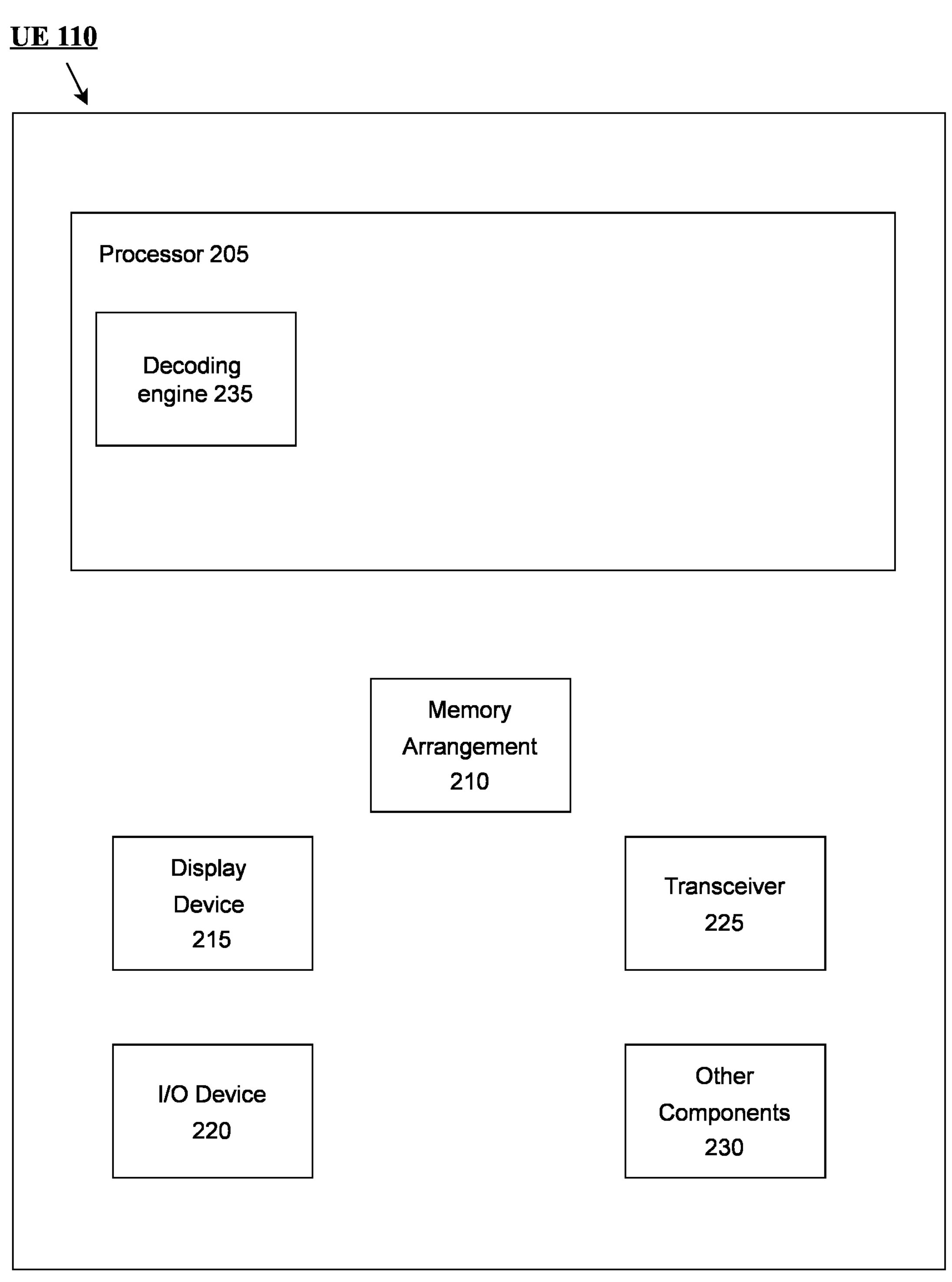
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a SIB/MIB decoding engine 235. The SIB/MIB decoding engine 235 may perform various operations such as, but not limited to, decoding a SIB without decoding PDCCH and/or decoding a MIB using timing information from another communication interface such as global navigation satellite system (GNSS) or another cell. Each of these various operations will be described in greater detail below.

The above referenced SIB/MIB decoding engine 235 being an application (e.g., a program) executed by the processor 205 is merely provided for illustrative purposes. The functionality associated with the SIB/MIB decoding engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
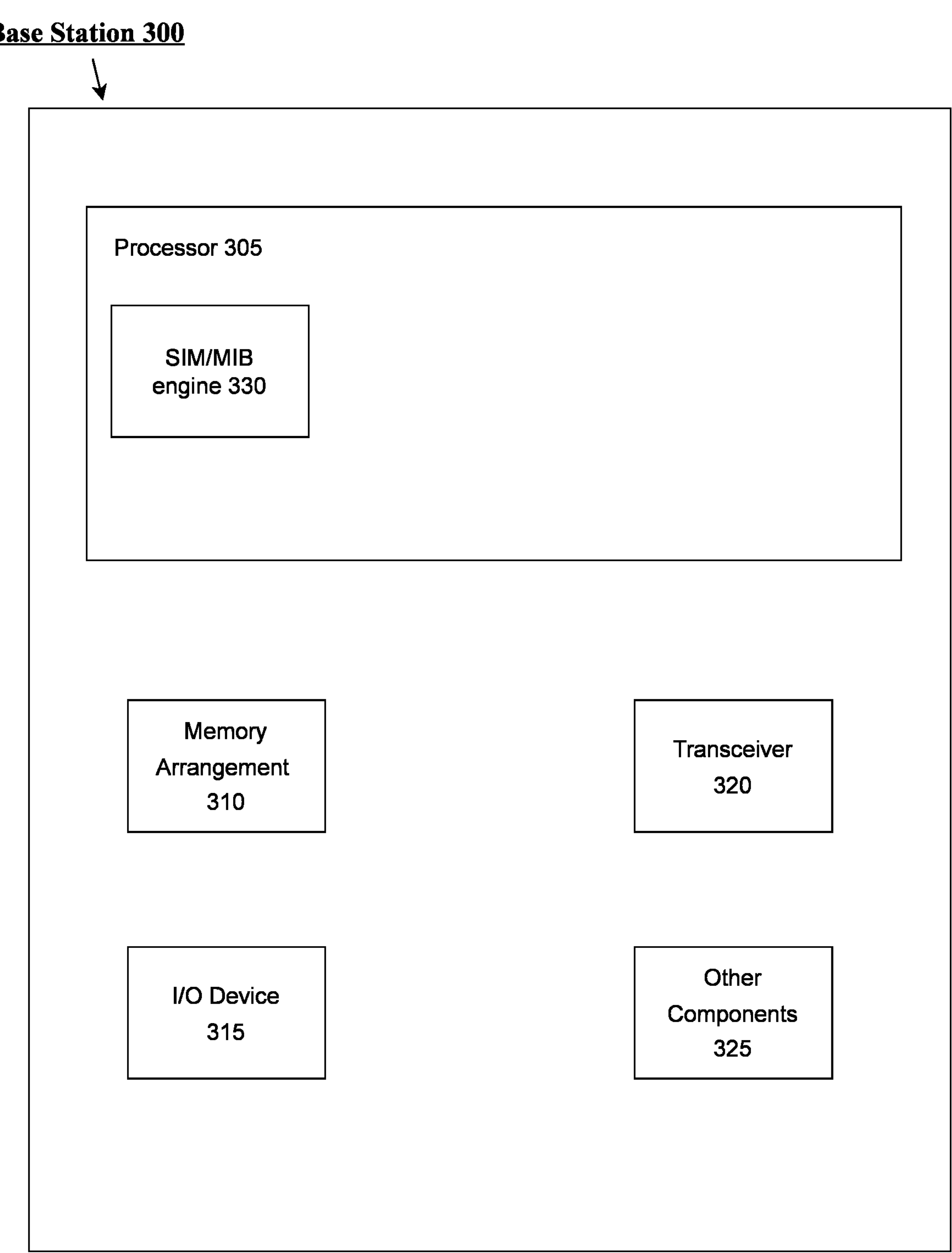
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a MIB or SIB engine 330. The MIB/SIB engine 330 may perform various operations related to the exemplary SIB and/or MIB described herein. The operations may include but are not limited to, providing cell search information to the UE and transmitting MIBs and/or SIBs to be decoded by the UE. Each of these various operations will be described in greater detail below.

The above noted MIB/SIB engine 330 being an application (e.g., a program) executed by the processor 305 is only exemplary. The functionality associated with the MIB/SIB engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory arrangement 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

In 5G NR, a base station (e.g., gNB 120A) transmits DCI via the PDCCH to the UE 110. Those skilled in the art will understand that the DCI transmitted over the PDCCH may contain fields such as, but not limited to, time domain resource assignment, frequency domain assignment, virtual resource block (VRB) to physical resource block (PRB) mapping, modulation and coding scheme (MCS), redundancy version (RV), system information (SI) indicator, etc. In conventional scenarios, blind decoding of the DCI in a PDCCH is performed by the UE 110. The UE 110 then uses this DCI to decode the SIB. That is, the information included in the DCI is the scheduling information needed by the UE 110 to decode the SIB. However, as described above, the decoding of the PDCCH may be the bottleneck in the decoding the SIB. Thus, the exemplary embodiments may use known or interpolated information about the DCI to decode the SIB without having to decode the PDCCH, thereby eliminating the bottleneck in SIB decoding. Specifically, in the exemplary embodiments, the UE 110 will know or derive the information that is contained in the DCI without decoding the PDCCH. Various manners of the UE 110 knowing or deriving the DCI information are described below.

In some exemplary embodiments, the above described fields for the DCI may be set to fixed values. These fixed values are known to the UE 110. When the UE 110 knows the values of the information included in the DCI, the UE 110 may generate the scheduling information for the SIB without decoding the PDCCH. That is, when the DCI is known to the UE 110, any decoding of the PDCCH will merely provide the same DCI information already known to the UE 110. Thus, there is no need to decode the PDCCH. Thus, the UE 110 may attempt to decode the SIB based on the scheduling information generated from the known DCI information without having to decode the PDCCH. In one example, the fixed values of the DCI fields may be preconfigured on the UE 110. In another example, the fixed values of the DCI fields may be hard coded in the 3GPP standards.

In other exemplary embodiments, the UE 110 may be unaware of the values of the DCI information. However, the UE 110 may be in possession of other information such as a primary synchronization signal (PSS) identification (ID), a secondary synchronization signal (SSS) ID, a demodulation reference signal (DMRS) ID, a cell ID, a system frame number (SFN), a geographical location of the UE, timing data, etc. This other information may then be used to derive the unknown DCI information which can then be used by the UE 110 to decode the SIB. That is, the UE 110 may implement a technique that generates a deterministic function between the existing information available at the UE 110 and the DCI fields to determine the scheduling information for the SIB. Examples of deriving the DCI information from other information will be provided below.

In one example, the UE 110 may obtain non-scheduling cell ID information such as the PSS ID, SSS ID, or DMRS ID prior to any transmission of control information from the gNB 120A during a cell search. The UE 110 may include a deterministic function that correlates the PSS/SSS ID and the frequency domain resource allocation parameters, such that the UE 110 may obtain this parameter deterministically, after the PSS/SSS ID is determined. Thus, in this example, the UE 110 may determine the frequency domain resource allocation parameters which is one of the DCI parameters used for SIB decoding.

In another example, the UE 110 may obtain timing and/or location information from another device, (e.g., a Global Navigation Satellite System (GNSS) device) prior to a cell search and/or SIB transmission from the gNB 120A. In one example based on the timing information, the UE 110 understands that the network will configure certain fields in the DCI based on the universal time. These fields may include, for example, the redundancy version (RV) field, the SIB indicator field, the time or frequency resource allocation fields, etc. If the UE 110 understands the universal time from the GNSS, the UE 110 may derive the DCI information for these fields. In another example based on geographic location, the UE 110 understands that the network will configure certain fields in the DCI based on the geographical location of the targeted UE. For example, the time domain resource allocation for the UE is configured as a function of the geographical area. The gNB 120A knows the location of the UE 110 based on the beam directions and the UE 110 knows the location based on the GNSS data. Thus, in this example, the UE 110 may determine various DCI information that may be used for SIB decoding.

In still further exemplary embodiments, the UE 110 may also be unaware of the values of the DCI information. In these exemplary embodiments, the UE 110 may perform a hypothesis-testing with unknown values of the DCI fields by assuming values for the unknown values of the DCI field to generate cyclic redundancy check (CRC) results for testing. Those skilled in the art will understand that, when the SIB is decoded correctly, the CRC generates some results indicating that the values of the DCI fields are correct. Alternatively, if the SIB decoding fails using the assumed values, the CRC fails to generate any results indicating that the DCI fields are correct. In one exemplary embodiment, the UE 110 may be configured to generate different value combinations for the unknown DCI fields to decode the SIB. In another exemplary embodiment, the UE 110 may be configured to implement other possible repetitions of the shared channel (SCH) for the hypothesis testing.

It should also be understood that the above examples may be used individually or in combination with one or more of the described examples. To provide a specific example, it may be considered that all three exemplary techniques described above may be used in conjunction with each other. For example, some of the DCI information may be a fixed value and known to the UE 110. The UE 110 may also know non-scheduling information (e.g., the timing and/or geographic information) and use that information to derive other DCI information. Finally, for the DCI information not known from the first two techniques, the UE 110 may perform the hypothesis testing to complete the DCI information. Thus, by using all three techniques, the UE 110 may understand the DCI information that may be used to decode the SIB. It should be understood that using all three techniques is only exemplary and other combinations of techniques may be used.

Figure 4:
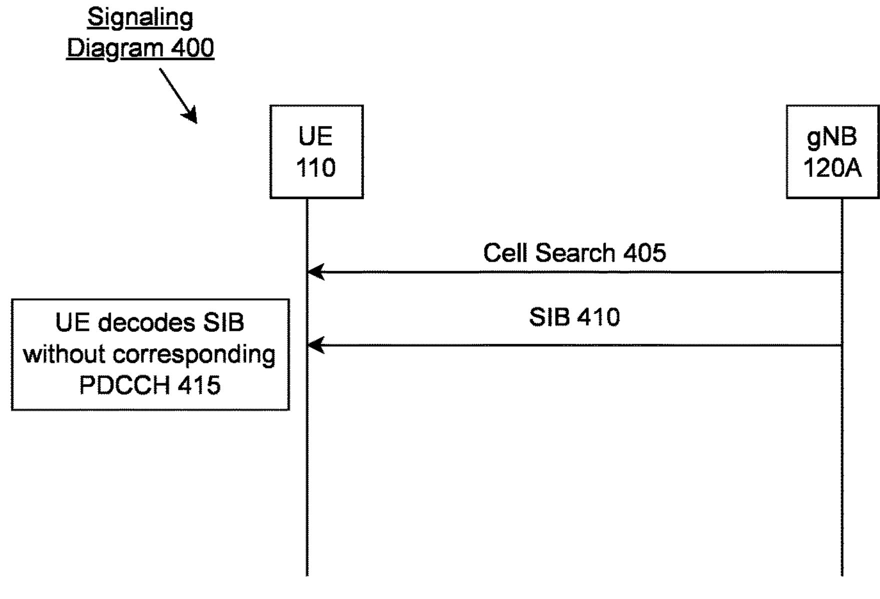
FIG. 4 shows a signaling diagram for system information block (SIB) decoding without decoding a PDCCH according to various exemplary embodiments.

FIG. 4 shows a signaling diagram 400 for system information block (SIB) decoding without decoding a PDCCH according to various exemplary embodiments. The signaling diagram 400 will be described with reference to the network arrangement of FIG. 1, the UE 110 of FIG. 2 and the gNB 120A of FIG. 3. It should also be understood that the signaling diagram 400 is not intended to describe all the operations of a cell search and acquisition procedure between the UE 110 and the gNB 120A. The procedure is only described to the extent of providing an illustration of SIB decoding without PDCCH decoding.

In 405, the UE 110 determines cell search information based on a cell search procedure performed by the UE 110 to find available gNBs. It may be considered that the cell search information includes the PSS ID, SSS ID and/or DMRS ID information described above. However, the cell search information is not limited to this information as other types of information may also be determined from the cell search. It may also be considered that the gNB 120A has transmitted the PDCCH with the DCI. However, the UE 110 has not decoded the PDCCH.

In 410, the gNB 120A transmits the SIB. The SIB may include information required by the UE 110 to attach to the gNB 120A and connect to the NR-RAN 120. However, as described above, the UE 110 has not decoded the PDCCH to obtain the DCI used to decode the SIB.

In 415, the UE 110 uses one of more of the techniques described above to decode the SIB without decoding the corresponding PDCCH. The techniques may include the fixed values for the DCI, deterministic functions used to determine DCI based on timing and/or geographic information and hypothesis testing for the DCI.

Thus, at the completion of the signaling diagram 400, the UE 110 has decoded the SIB without decoding the corresponding PDCCH.

As described above, other exemplary embodiments are related to decoding of a MIB. Those skilled in the art will understand that the MIB includes information required to attach to a cell (e.g., gNB 120A). The UE 110 is required to decode the MIB to obtain this information. The information in the MIB, includes, but is not limited to timing information (e.g., SFN), which is almost one-third of the whole MIB payload. The UE 110 is required to decode the entirety of the MIB to obtain the necessary information to attach to a cell. However, in low SNR scenarios, the UE 110 may not be able to successfully decode the MIB and therefore the attach procedure may fail.

The exemplary embodiments are related to using the fact that the SFN is such a large part of the MIB and that the SFN may be obtained by the UE 110 from other information sources. For example, if the UE 110 obtains the SFN from another information source, the UE 110 now has known information that is in the MIB. The UE 110 may then use various processing techniques in conjunction with the known SFN to decode the MIB. As those skilled in the art will understand, the MIB may be encoded using polar codes and corresponding error correction techniques using the known SFN information may be used for decoding.

In the exemplary embodiments, the UE 110 may be configured to determine the SFN based on timing information received from another communication interface (e.g., GNSS, another cell, etc.) to generate the timing information of the MIB to be decoded. The SFN has a fixed number of frames before repeating, e.g., 0-1023. Thus, by knowing when the network starts the SFN count and the precise time, the UE 110 will understand the current SFN being transmitted by the network (e.g., gNB 120A). As described above, this SFN will also be included in the MIB, thus the UE 110 knows at least some of the information that is included in the MIB that the UE is attempting to decode.

In another exemplary embodiment, in 5G NR, the MIB transmission is encoded using a polar code which relies on the concept of bit-freezing to adjust its code-rate. Those skilled in the art will understand the concept of polar code as described in the 3GPP standards. Thus, since the UE 110 may be configured to generate the SFN as previously described, the SFN may be fed into the decoder to improve the MIB decoding performance. For example, one of the main aspects of the polar code is determining information in non-frozen bit positions by using the frozen bits in the frozen bit positions. Thus, when the SFN is fed into the polar decoder as frozen bits (in addition to the frozen bits defined by the code structure), the decoder will be more capable of correcting errors, and MIB decoding will be improved.

Figure 5:
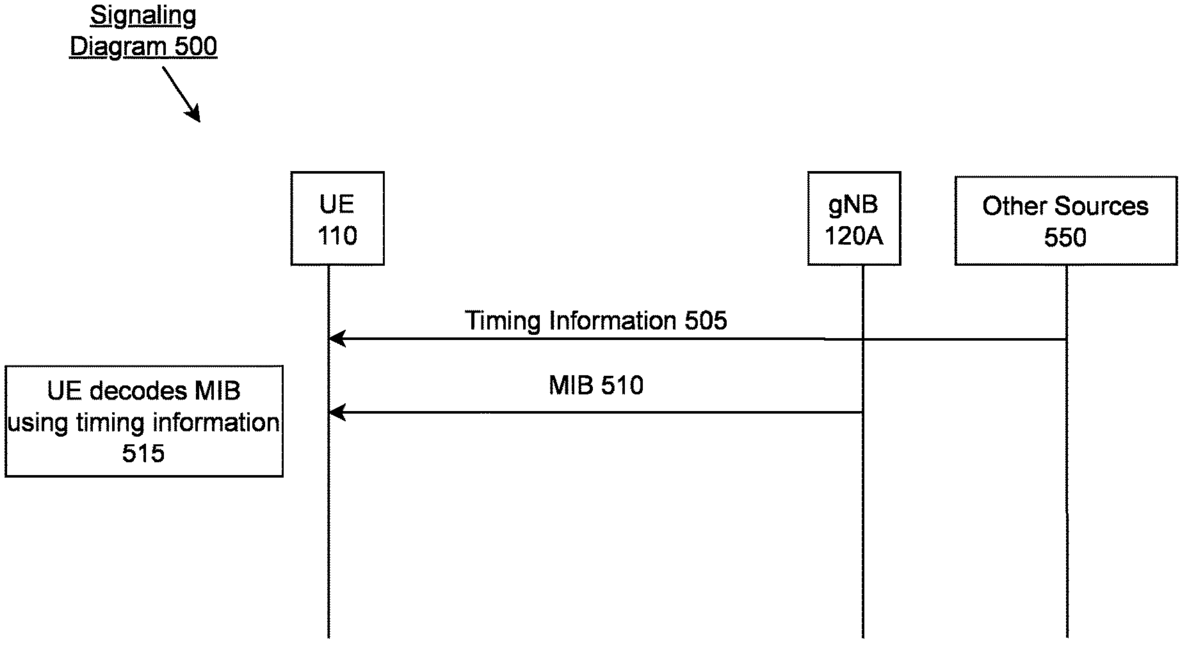
FIG. 5 shows a signaling diagram for master information block (MIB) decoding according to various exemplary embodiments.

FIG. 5 shows a signaling diagram 500 for MIB decoding according to various exemplary embodiments. The signaling diagram 500 will be described with regard to the network arrangement 100 of FIG. 1, the UE 110 of FIG. 2 and the base station 300 (e.g., gNB 120A) of FIG. 3.

In 505, the UE 110 receives additional information from another source 550, e.g., GNSS, a different cell, etc. This additional information may include timing information. As described above, based on this timing information, the UE 110 will understand the SFN information being transmitted by the gNB 120A. It should be understood that timing information is only exemplary. There may be other types of additional information that may be used by the UE 110 to determine the SFN information. In other exemplary embodiments, other information that is included in the MIB (beside the SFN) may be determined from this additional information from other sources.

In 510, the gNB 120A transmits a message (e.g., the MIB) to the UE 110 including the SFN information. As described above, the MIB may include information required by the UE 110 to attach to the gNB 120A.

In 515, the UE 110 attempts to decode the MIB using error correction techniques based the known SFN derived from the additional information (e.g., timing information) received from the other sources. Thus, the UE 110 may be more successful in decoding the MIB because the UE 110 has the known SFN that may be used in conjunction with error correction techniques in the decoding process.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving, from a cell of a network, a system information block (SIB);

determining values for scheduling information for the SIB without decoding a Physical Downlink Control Channel (PDCCH) corresponding to the SIB, wherein the values for the scheduling information are determined based on non-scheduling information, wherein the non-scheduling information comprises cell identification information, and wherein the cell identification information comprises a demodulation reference signal (DMRS) ID; and decoding the SIB using the scheduling information.

2. The processor of claim 1, wherein the scheduling information comprises at least some information that is included in Downlink Control Information (DCI) in the PDCCH corresponding to the SIB, wherein the scheduling information is determined without using the DCI in the PDCCH corresponding to the SIB.

3. The processor of claim 1, wherein the scheduling information comprises time domain resource assignment, frequency domain assignment, virtual resource block (VRB) to physical resource block (PRB) mapping, modulation and coding scheme (MCS), a redundancy version (RV), or a system information (SI) indicator.

4. The processor of claim 1, wherein the non-scheduling information further comprises timing information or geographic information.

5. The processor of claim 4, wherein the timing information or the geographic information is determined from a global navigation satellite system (GNSS).

6. The processor of claim 5, wherein the timing information is used to determine a redundancy version (RV) field, a SIB indicator field, a time domain resource allocation or a frequency domain resource allocation.

7. The processor of claim 5, wherein the geographic information is used to determine a time domain resource allocation or a frequency domain resource allocation of the scheduling information.

8. The processor of claim 1, wherein the cell identification information is used to determine a frequency domain resource allocation or a time domain resource allocation of the scheduling information.

9. The processor of claim 1, wherein values for the scheduling information are determined based on hypothesis testing.

10. A processor of a user equipment (UE) configured to perform operations comprising:

receiving, from a cell of a network, a message to be decoded, wherein the message comprises a master information block (MIB) encoded using polar codes;

receiving, from a source different from the cell, additional information related to a portion of the message;

determining the portion of the message using the additional information; and decoding the message based at least in part on the portion of the message.

11. The processor of claim 10, wherein the additional information comprises timing information and the portion of the message comprises a value of a system frame number (SFN).

12. The processor of claim 11, wherein the timing information is received from a global navigation satellite system (GNSS).

13. A user equipment (UE), comprising:

a transceiver configured to communicate with a cell of a network; and a processor communicatively coupled to the transceiver and configured to perform operations comprising:

receiving, from the cell of the network, a message to be decoded, wherein the message comprises a master information block (MIB) encoded using polar codes;

receiving, from a source different from the cell, additional information related to a portion of the message;

determining the portion of the message using the additional information; and decoding the message based at least in part on the portion of the message.

14. The UE of claim 13, wherein the additional information comprises timing information and the portion of the message comprises a value of a system frame number (SFN).

15. The UE of claim 14, wherein the timing information is received from a global navigation satellite system (GNSS).

* * * * *